C. E. HODGE & S. P. ANDERSEN.
MILKING MACHINE TEAT CUP.
APPLICATION FILED OCT. 26, 1909.
948,608. Patented Feb. 8, 1910.
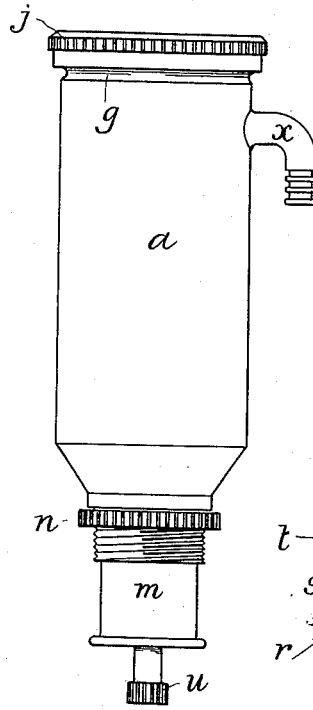
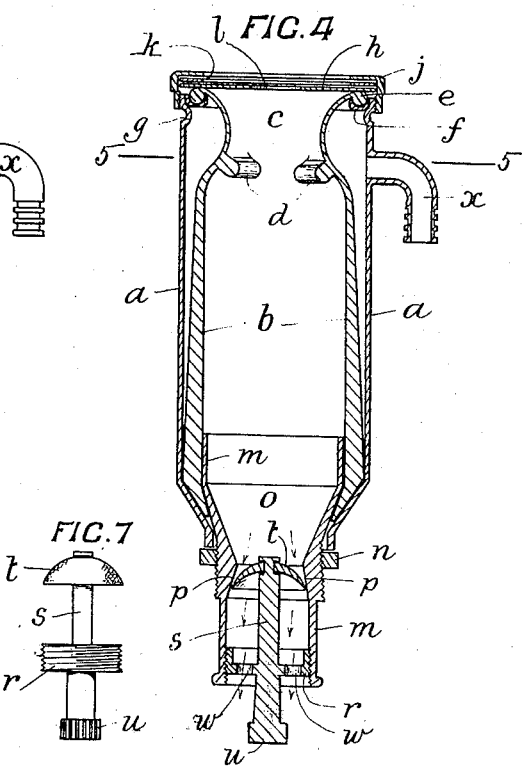
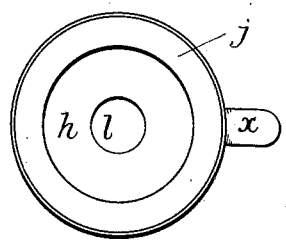
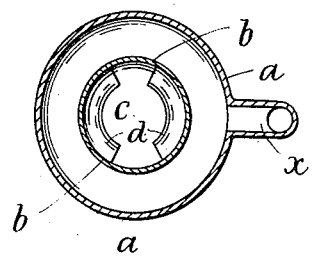
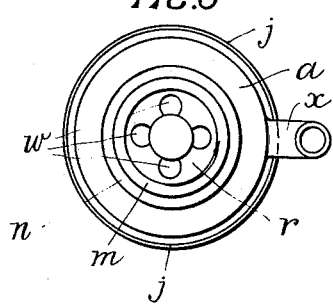
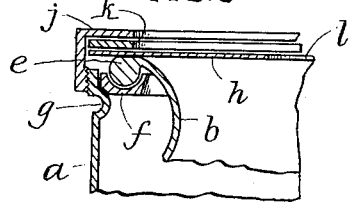
WITNESSES
W. P. Burke
J. A. Minns
INVENTORS
Charles Edward Hodge
Soren Peder Andersen
BY
ATTY.

UNITED STATES PATENT OFFICE.

CHARLES EDWARD HODGE AND SOREN PEDER ANDERSEN, OF AUCKLAND, NEW ZEALAND.

MILKING-MACHINE TEAT-CUP.

948,608.                    Specification of Letters Patent.     Patented Feb. 8, 1910.

Application filed October 26, 1909. Serial No. 524,686.

*To all whom it may concern:*

Be it known that we, CHARLES EDWARD HODGE and SOREN PEDER ANDERSEN, subjects of the King of Great Britain, residing at 103 Queen street, Auckland, in the Dominion of New Zealand, have invented a new and useful Improvement in Milking-Machine Teat-Cups; and we do hereby declare the following to be a full, clear, and exact description of the same.

This invention relates to a new construction of milking machine teat cup that has been designed in order to provide for the milk being drawn from the cow without the use of the vacuum suction generally employed, and thereby to do away with the use of rubber tubes and other connections for conveying the milk to the cans.

The teat cup designed and forming the subject of this invention depends for its action upon the teat, in order to draw the milk therefrom, upon the alternate compression and rarefaction of a small quantity of air surrounding the teat, combined with a down and up movement of the teat cup, and also of an alternate squeezing and releasing action on the teat caused by an inflatable lining of the cup. These combined actions will serve to express the milk contained in the teat and to draw fresh milk down into it, while the up and down movements of the cup on the teat will tend to excite the milk glands of the cow, so that she will more readily let her milk go.

The teat cup specially relates to improvements in that class of cup comprising an outer rigid casing and an inner flexible lining adapted to be inflated and deflated by the admission and withdrawal of air to and from the space between the lining and the casing. In this invention, this lining at its lower end is attached to or is formed as a rigid portion so as to be unaffected by the inflation or deflation and thereby to constitute a constant air chamber. The upper end of the lining is constricted in diameter, and is securely fastened, at its top edge, to the casing. A flexible mouthpiece extends across the top of the lining, such mouthpiece being adapted to receive the teat. The lower end of the lining leads into a valve chamber on which an adjustable air tight valve is fitted, such valve being capable only of opening outward to allow of the milk flowing down through it.

In order, however, that the invention may be properly understood, reference will be made to the accompanying sheet of drawings, in which:—

Figure 1 is an elevation of the improved cup. Fig. 2 is a plan, and Fig. 3 is an underneath plan thereof. Fig. 4 is a sectional elevation of the cup. Fig. 5 is a sectional plan thereof, taken on the line 5—5 of Fig. 4. Fig. 6 is a detail sectional view illustrating the manner of holding the upper edge of the inflatable lining. Fig. 7 is an elevation of the milk outlet valve.

$a$ is the casing of the cup made of metal or other rigid material, and $b$ is the inner lining of flexible material, such as rubber. In this invention, this lining is formed with a constricted area $c$ near its top end, and is provided with the corrugations $d$ extending inward from the surface of such constricted portion. The upper edge of the lining is formed with the bead $e$ which rests in the concave of a ring $f$ fitting into the upper end of the casing $a$ and resting upon a ledge $g$ formed thereon. A rubber disk $h$ is then placed over the top of the lining and the whole securely fastened in position by means of the annular cap $j$ screwed on to the upper end of the casing, a ring washer $k$ being placed between the cap and the disk to prevent the latter being misplaced as the cap is being screwed down. The disk $h$ is formed with an aperture $l$ in its center, which aperture is adapted to allow of the cow's teat being passed through into the cup and to fit closely around it.

The lower end of the lining is secured to a rigid cylindrical piece $m$ the lower end of which is adapted to pass freely through the bottom of the casing $a$ and then to be secured by means of the nut $n$ screwed upon it, and engaging with the bottom edge of the casing. The lining $b$ will thus be held firmly within the casing $a$ by being fastened at its top and bottom ends in the manner described. The cylindrical piece $m$ extends up the lining for a short distance, as shown in Fig. 4, in order thus to constitute an inflexible lower portion inclosing the air chamber $o$ within it. If desired, however, this chamber may be constituted by forming the lining itself rigid near its lower end. The bottom portion of this cylinder $m$ is formed with the valve seat $p$ therein and a plate $r$ carrying a valve stem $s$, is adapted to be screwed into the bottom end of the cylinder. This stem carries a mushroom valve $t$ upon its upper end, which valve is adapted to fit upon the valve seat $p$ and to close the passage through the cylinder. The valve is made of flexible material, so that it will be capable of opening from the inside by pressure, but will be incapable of opening from the outside. The engagement of the valve upon its seat may be regulated by screwing the plate $r$ in or out, a finger piece $u$ being provided for that purpose. The plate $r$ is formed with a number of apertures $w$ therein so as to allow for the milk passing freely through.

The casing $a$ is provided with the usual pipe connection $x$ by means of which the cup may be connected in the well known manner, with means for forcing air into the space between the casing and the lining and for withdrawing it therefrom.

In operation, air is first forced in through the connection $x$ so as to inflate the lining, causing it to close inward and expel most of the air contained therein. While in this condition, the cow's teat is placed within the aperture $l$ of the disk $h$ and the air is then withdrawn from the space outside the lining. This will cause the lining to open out and thereby cause a rarefaction of the air within it, or a partial vacuum to be formed. This will draw the cup right up on to the teat. The operations of alternately expanding and contracting the lining will then be continued, and as the lining contracts, it will squeeze upon the teat forcing the milk therefrom, and at the same time compressing the air within the air chamber $o$. This compressed air will force the valve $t$ open and allow the milk to pass down and out of the bottom of the cup. It will also tend to force the cup down the teat, but such movement will be prevented beyond a certain extent by means of the constricted neck of the lining and the corrugations $d$ thereon. As the lining expands again, the rarefaction of the air within it will cause the cup to slip up the teat again, will shut the valve $t$ and will exert a slight suction upon the teat serving to draw the milk down through it, while the teat being released from the pressure of the lining will expand again to its normal size in order that the milk may flow into it. These operations will be continued until the whole of the milk has been drawn from the cow, such milk falling clear into a bucket or the like placed below.

The amount of air remaining in the air chamber $o$ may be regulated by adjusting the pressure of the valve $t$ upon its seat, so that by these means, the degree of vacuum obtained in the cup may be adjusted in order that the suction thereof may be employed to also draw the milk from the teat, instead of using the pressure of the lining for that purpose.

The provision of the air chamber is an important feature of the invention as the presence of the air is required to open the milk outlet valve, and also to provide for the proper expansion of the lining when the air is being withdrawn from the space around it.

The cups will be arranged, as ordinarily, in sets of four secured upon a suitable frame or claw and, if desired, the four cups may be connected with a single air chamber having the outflow valve therein, instead of each cup having a separate valve.

What we do claim as our invention, and desire to secure by Letters Patent, is:—

1. In milking machine teat cups, the combination with an outer casing, of an inner flexible lining having a constant air space within its lower end, a valve hermetically closing such end and capable only of opening outward, and a flexible mouthpiece secured over the top end of the casing and adapted to fit closely around the cow's teat, substantially as specified.

2. In milking machine teat cups, an outer casing, an inner flexible lining secured within such casing and having an inflexible lower end, a valve cylinder extending from the lower end of the lining, and a valve mounted within and hermetically closing such cylinder and adapted only to open outward, a flexible mouthpiece secured upon the top end of the cup, and means whereby the space around the lining may be connected with an air pump or the like, substantially as specified.

3. In milking machine teat cups, the combination with an outer casing having a flexible mouthpiece secured across its upper end, of a flexible lining secured within the casing and having an air chamber in communication with its lower end and a valve controlling the entry to such air chamber and capable only of opening outward, substantially as specified.

4. In milking machine teat cups, an outer casing, a flexible lining secured within such casing, a rigid cylinder attached to the bottom end of the lining and projecting below the bottom end of the casing, a valve seat formed inside such cylinder, a perforated plate screwed into the bottom end of the cylinder, a valve stem upon such plate and a flexible valve upon the stem adapted to fit beneath the valve seat, substantially as specified.

In testimony whereof, we have signed this specification in the presence of two subscribing witnesses.

CHARLES EDWARD HODGE.
SOREN PEDER ANDERSEN.

Witnesses:
ESTER BROOKE SMITH,
E. F. COURTNEY.